(12) United States Patent  
Okamura et al.

(10) Patent No.: US 12,122,253 B2  
(45) Date of Patent: Oct. 22, 2024

(54) VEHICLE CHARGING APPARATUS AND MECHANICAL PARKING APPARATUS

(71) Applicant: GIKEN LTD., Kochi (JP)

(72) Inventors: Yukihide Okamura, Kochi (JP); Kazunari Takahashi, Kochi (JP); Tatsuya Saibara, Kochi (JP)

(73) Assignee: GIKEN LTD., Kochi (JP)

( * ) Notice: Subject to any disclaimer, the term of this patent is extended or adjusted under 35 U.S.C. 154(b) by 0 days.

(21) Appl. No.: 18/686,720

(22) PCT Filed: Aug. 30, 2022

(86) PCT No.: PCT/JP2022/032575  
§ 371 (c)(1),  
(2) Date: Feb. 26, 2024

(87) PCT Pub. No.: WO2023/032977  
PCT Pub. Date: Mar. 9, 2023

(65) Prior Publication Data  
US 2024/0270097 A1  Aug. 15, 2024

(30) Foreign Application Priority Data  
Aug. 31, 2021  (JP) ................................ 2021-140667

(51) Int. Cl.  
*B60L 53/16* (2019.01)  
*B60L 53/36* (2019.01)  
*E04H 6/22* (2006.01)  
*H01R 43/26* (2006.01)

(52) U.S. Cl.  
CPC ............. *B60L 53/16* (2019.02); *B60L 53/36* (2019.02); *E04H 6/22* (2013.01); *H01R 43/26* (2013.01)

(58) Field of Classification Search  
CPC . B60L 53/16; B60L 53/36; E04H 6/22; H01R 43/26  
See application file for complete search history.

(56) References Cited

U.S. PATENT DOCUMENTS

2021/0087840 A1*  3/2021  Hu ........................... B60L 53/00  
2022/0055495 A1*  2/2022  Labell .................... B60L 53/37

FOREIGN PATENT DOCUMENTS

| CN | 103282590 A | 9/2013 |
| CN | 103842599 A | 6/2014 |
| CN | 211776230 U | 10/2020 |

(Continued)

OTHER PUBLICATIONS

Office Action issued in corresponding Japanese Patent Application No. 2021-140667, dated Nov. 29, 2022, with translation (4 pages).

(Continued)

*Primary Examiner* — David V Henze-Gongola  
(74) *Attorney, Agent, or Firm* — Osha Bergman Watanabe & Burton LLP (57) ABSTRACT

A charging box of a vehicle charging apparatus connects with a placement part provided on a carrier when a vehicle is carried by the carrier. The charging box then connects to a charging box receiving part provided on a storage with a movement of the vehicle from the carrier to the storage. The charging box is disconnected from the placement part after the connection of the charging box to the charging box receiving part.

10 Claims, 11 Drawing Sheets

(56) References Cited

FOREIGN PATENT DOCUMENTS

| | | | |
|---|---|---|---|
| CN | 112829611 A | | 5/2021 |
| JP | 2002004620 A | | 1/2002 |
| JP | 2010084491 A | | 4/2010 |
| JP | 2011094434 A | * | 5/2011 |
| JP | 2011117158 A | * | 6/2011 |
| JP | 2013160024 A | | 8/2013 |
| JP | 2014134079 A | | 7/2014 |
| JP | 2015040421 A | | 3/2015 |
| JP | 2016200001 A | | 12/2016 |
| JP | 2019206823 A | * | 12/2019 |
| JP | 2021025248 A | | 2/2021 |

OTHER PUBLICATIONS

Decision to Grant a Patent issued in corresponding Japanese Patent Application No. 2021-140667, dated Dec. 20, 2022, with translation (5 pages).
International Search Report issued in corresponding International Application No. PCT/JP2022/032575, dated Oct. 18, 2022, with translation (5 pages).
Written Opinion issued in corresponding International Application No. PCT/JP2022/032575, dated Oct. 18, 2022 (3 pages).
Extended European Search Report issued in corresponding EP application No. 22864559.4, dated Aug. 8, 2024 (10 pages).
Office Action issued in corresponding Chinese application No. 202280058933.9, dated Aug. 22, 2024 (9 pages).

* cited by examiner

VEHICLE CHARGING APPARATUS AND MECHANICAL PARKING APPARATUS

CROSS-REFERENCE TO RELATED APPLICATION

This application is based on and claims the benefit of priority of Japanese Patent Application No. 2021-140667 filed on Aug. 31, 2021, the entire contents of which are incorporated herein by reference.

TECHNICAL FIELD

The present disclosure relates to a vehicle charging apparatus and an automated parking apparatus.

BACKGROUND ART

In recent years, as electric cars and rechargeable hybrid cars (PHV: Plug-in Hybrid Vehicles) have become widespread, automated parking apparatuses have developed that are provided with charging apparatuses for charging checked-in vehicles.

Patent documents 1 to 6 each describe a charging apparatus for an automated parking apparatus in which a carrier with a pallet loaded with a vehicle moves to a storage for the vehicle and stores the vehicle in the storage along with the pallet. In such an automated parking apparatus, a charging contact to be connected with a charging cable of the vehicle is fixed to the pallet. The pallet loaded with the vehicle is then stored in the storage and at the same time the charging contact of the pallet is connected to a feeding contact provided on the storage, where the vehicle is charged.

PRIOR ART DOCUMENTS

Patent Documents

Patent document 1: Japanese Patent Laid-Open Application No. 2002-004620
Patent document 2: Japanese Patent Laid-Open Application No. 2010-084491
Patent document 3: Japanese Patent Laid-Open Application No. 2013-160024
Patent document 4: Japanese Patent Laid-Open Application No. 2014-134079
Patent document 5: Japanese Patent Laid-Open Application No. 2015-040421
Patent document 6: Japanese Patent Laid-Open Application No. 2016-200001

SUMMARY OF THE INVENTION

Problem to be Solved by the Invention

Some automated parking apparatuses, however, transfer only vehicles from the carrier to the storages instead of storing vehicles in the storages with the pallets. The charging contact fixed to the pallet cannot be used for such automated parking apparatuses.

A purpose of the disclosure made in view of the above is to provide a vehicle charging apparatus and an automated parking apparatus that allow for charging a stored vehicle even if the automated parking apparatus transfers only vehicles from the carrier to the storages.

Means for Solving the Problem

A vehicle charging apparatus of the disclosure is for an automated parking apparatus that carries a vehicle to a specified floor by means of a carrier operable to move up and down, moves the vehicle from the carrier to a specified storage provided on the specified floor, and stores the vehicle in the storage, and the vehicle charging apparatus comprises: a charging part for being connected with a charging cable of the vehicle; a placement part provided on the carrier for connecting to the charging part; and a feeding part provided on the storage for connecting to the charging part and supplying power to the charging cable, where the charging part connects with the placement part when the vehicle is carried by the carrier, the charging part connects to the feeding part with the movement of the vehicle from the carrier to the storage, and the charging part is disconnected from the placement part after the connection of the charging part to the feeding part.

The charging part of this configuration connects with the placement part provided on the carrier when the vehicle is carried by the carrier. The charging part connects to the feeding part provided on the storage with the movement of the vehicle from the carrier to the storage, and the charging part is disconnected from the placement part after the connection of the charging part to the feeding part.

This allows the charging part placed on the carrier to move to the storage with the storing of the vehicle in the storage, and then the vehicle is charged from the feeding part via the charging cable connected to the charging part. Therefore, even the automated parking apparatus that transfers only a vehicle from the carrier to the storage allows for charging the stored vehicle.

In the vehicle charging apparatus of the disclosure, when the vehicle is checked in, the carrier loaded with the vehicle may elongate to the storage with the vehicle being loaded thereon after moving to the specified floor and may contract after moving downward relative to the storage and thereby moving the vehicle to the storage, and the charging part may connect to the feeding part with the elongation of the carrier and may be disconnected from the placement part with the carrier's downward movement relative to the storage.

When the vehicle is checked in in this configuration, the charging part connects to the feeding part with the elongation operation of the carrier for moving the vehicle from the carrier to the storage, and the charging part is disconnected from the placement part with the carrier's relative downward movement. The configuration therefore eliminates the need for a dedicated configuration to allow for the connection of the charging part to the feeding part and the disconnection of the charging part from the placement part.

In the vehicle charging apparatus of the disclosure, when the vehicle is checked out, the carrier may elongate to the storage after moving to the specified floor on which the vehicle to be checked out is stored and may contract after moving upward relative to the storage and thereby moving the vehicle from the storage, and the charging part may connect to the placement part with the carrier's upward movement relative to the storage and may be disconnected from the feeding part with the contraction of the carrier.

When the vehicle is checked out in this configuration, the charging part connects to the placement part with the carrier's relative upward movement, and the charging part is disconnected from the feeding part with the contraction operation of the carrier for moving the vehicle from the storage to the carrier. The configuration therefore eliminates the need for a dedicated configuration to allow for the connection of the charging part to the feeding part and the disconnection of the charging part from the placement part.

In the vehicle charging apparatus of the disclosure, the charging part may connect to the placement part on the charging part's underside, and may connect to the feeding part in a direction of the vehicle's movement from the carrier to the storage.

This configuration allows the charging part to connect to or be disconnected from the placement part provided on the carrier and the feeding part provided on the storage with ease.

In the vehicle charging apparatus of the disclosure, the placement part may be provided below the vehicle loaded on the carrier and near a front wheel of the vehicle.

This configuration allows the placement part to be provided at a place convenient for an occupant of the vehicle.

In the vehicle charging apparatus of the disclosure, the storage may comprise: a pair of body parts extending in a direction parallel to both sides of the vehicle; and a plurality of wheel support members provided in a direction perpendicular to the body parts in order to support each wheel of the vehicle in a front-rear direction of the vehicle, and a loading part of the carrier for being loaded with the vehicle to move to the storage may be formed with gaps through which the wheel support members pass in a vertical direction.

This configuration allows for charging the vehicle to be stored even in an automated parking apparatus of a so-called comb type.

An automated parking apparatus of the disclosure carries a vehicle to a specified floor by means of a carrier operable to move up and down, moves the vehicle from the carrier to a specified storage provided on the specified floor, and stores the vehicle in the storage, and the automated parking apparatus comprises: a charging part for being connected with a charging cable of the vehicle; a placement part provided on the carrier for connecting to the charging part; and a feeding part provided on the storage for connecting to the charging part and supplying power to the charging cable, where the charging part connects with the placement part when the vehicle is carried by the carrier, the charging part connects to the feeding part with the movement of the vehicle from the carrier to the storage, and the charging part is disconnected from the placement part after the connection of the charging part to the feeding part.

Advantage of the Invention

The disclosure allows for charging a stored vehicle even in the automated parking apparatus that transfers only vehicles from the carrier to the storages.

MODES OF EMBODYING THE INVENTION

An embodiment of the disclosure will now be described with reference to the drawings. The embodiment described below is merely illustrative of ways to implement the disclosure, and does not limit the disclosure to the specific configurations described below. When the disclosure is to be implemented, any specific configuration may be appropriately adopted according to the mode of implementation.

Figure 1:
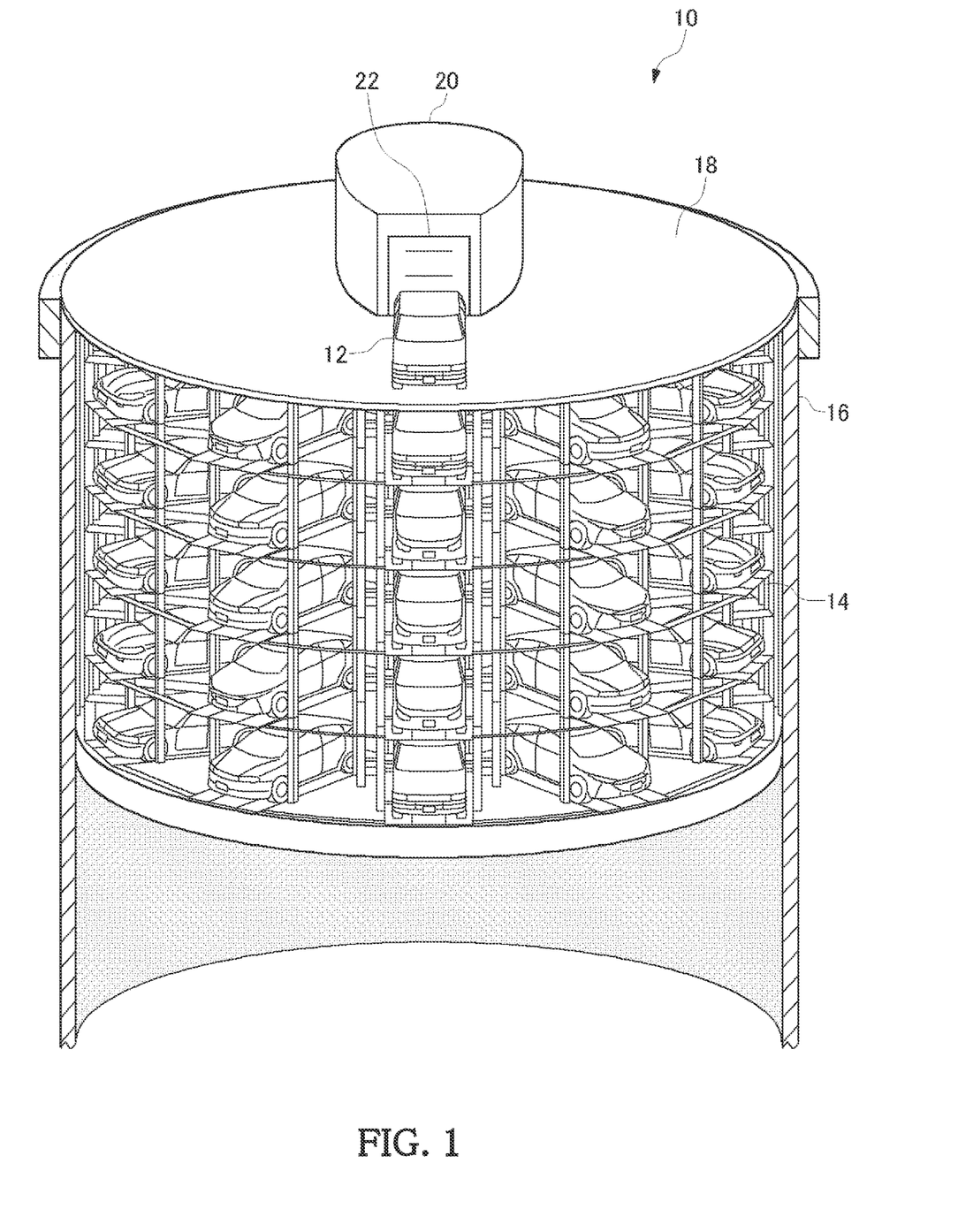
FIG. 1 is a transparent perspective view of a parking facility of an embodiment.
Figure 2:
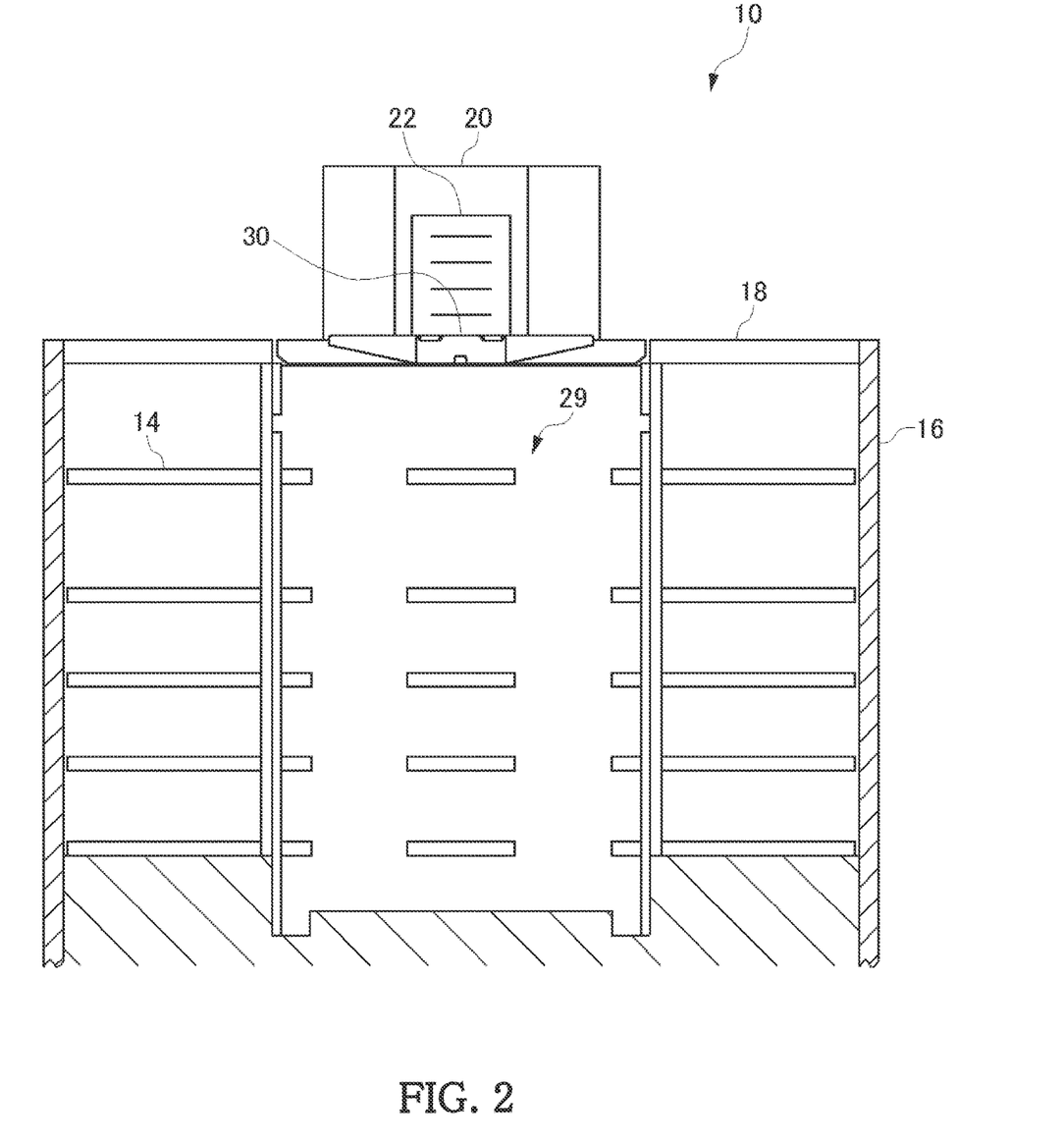
FIG. 2 is a cross-sectional view seen from the front direction of the parking facility of the embodiment.

A schematic configuration of an automated parking facility (hereinafter referred to as the "parking facility") 10 of the embodiment will be described with reference to FIGS. 1 and 2. FIG. 1 is a transparent perspective view of the parking facility 10 of the embodiment. FIG. 2 is a cross-sectional view seen from the front direction of the parking facility 10 of the embodiment.

The parking facility 10 of the embodiment is an underground parking facility whose frame 16 comprising a plurality of storages 14 for the storing of vehicles 12 is buried underground. Vehicles 12 to be stored in the parking facility 10 of the embodiment are not specifically limited, but electric cars and rechargeable hybrid cars (PHV: Plug-in Hybrid Vehicles) are the most suitable. The embodiment is not limited to this, and the parking facility 10 may be designed for the storing of only cars of a specific standard whose wheelbase is of a specific length. Such design allows for reducing the number of parts of the entire parking facility 10 and internal mechanical apparatuses comprising it, achieving simplification.

As shown in FIG. 1, the parking facility 10 is constructed of the storages 14 hierarchically provided inside the frame 16 cylindrically formed from the ground down to the underground levels. The frame 16 is formed cylindrically as a whole by circularly aligning and installing a plurality of piles. While the storages 14 have five layers in the example in FIGS. 1 and 2, the embodiment is not limited to this, and the storages 14 are only required to have a plurality of layers. The frame 16 may be formed not just by the installation of piles, but also by using concrete or steel frames.

The opening of the frame 16 on the ground level is covered with a lid plate 18. A building 20 is provided on the lid plate 18 in the center of the cylindrical frame 16. The building 20 is provided with a vehicle doorway 22 where vehicles 12 enter or exit, and there is a check-in and check-out room 24 inside (see FIG. 3).

A carrier 30 for being loaded with a vehicle 12 is provided inside the frame 16, and the lid plate 18 is formed with an opening at a position corresponding to the carrier 30. For this reason, the building 20 is positioned in such a way as to enclose at least the opening of the lid plate 18. When checking in, an occupant of a vehicle 12 drives the vehicle 12 into the building 20, parks it on the carrier 30 located within the building 20, and gets out of the vehicle 12. When checking out, an occupant gets in a vehicle 12 loaded on the carrier 30 located within the building 20, and drives it to exit the building 20.

The carrier 30 is loaded with a vehicle 12 and moves up and down in a hoistway 29. The hoistway 29 is a space for the carrier 30 to move up and down in the central area of the frame 16. The carrier 30 transfers vehicles 12 to and from the storages 14 provided radially around the hoistway 29.

Specifically, when a vehicle 12 is checked in, the parking facility 10 carries a vehicle 12 to a specified floor by means of the carrier 30 operable to move up and down, moves the vehicle 12 from the carrier 30 to a specified storage 14 provided on the specified floor, and stores the vehicle 12 in the storage 14. When a vehicle 12 is checked out, on the other hand, the parking facility 10 moves the carrier 30 to a storage 14 in which the vehicle 12 to be checked out is stored, and moves the vehicle 12 from the storage 14 to the carrier 30. The carrier 30 then carries the vehicle 12 to the building 20.

Note that the carrier 30 is made to be able to rotate in any direction, and can turn the front of a vehicle 12 moved from a storage 14 to the building 20 for check-out toward the vehicle doorway 22. A storage 14 in which a vehicle 12 is to be stored is determined by a conventionally known method when the vehicle 12 is checked in.

Figure 3:
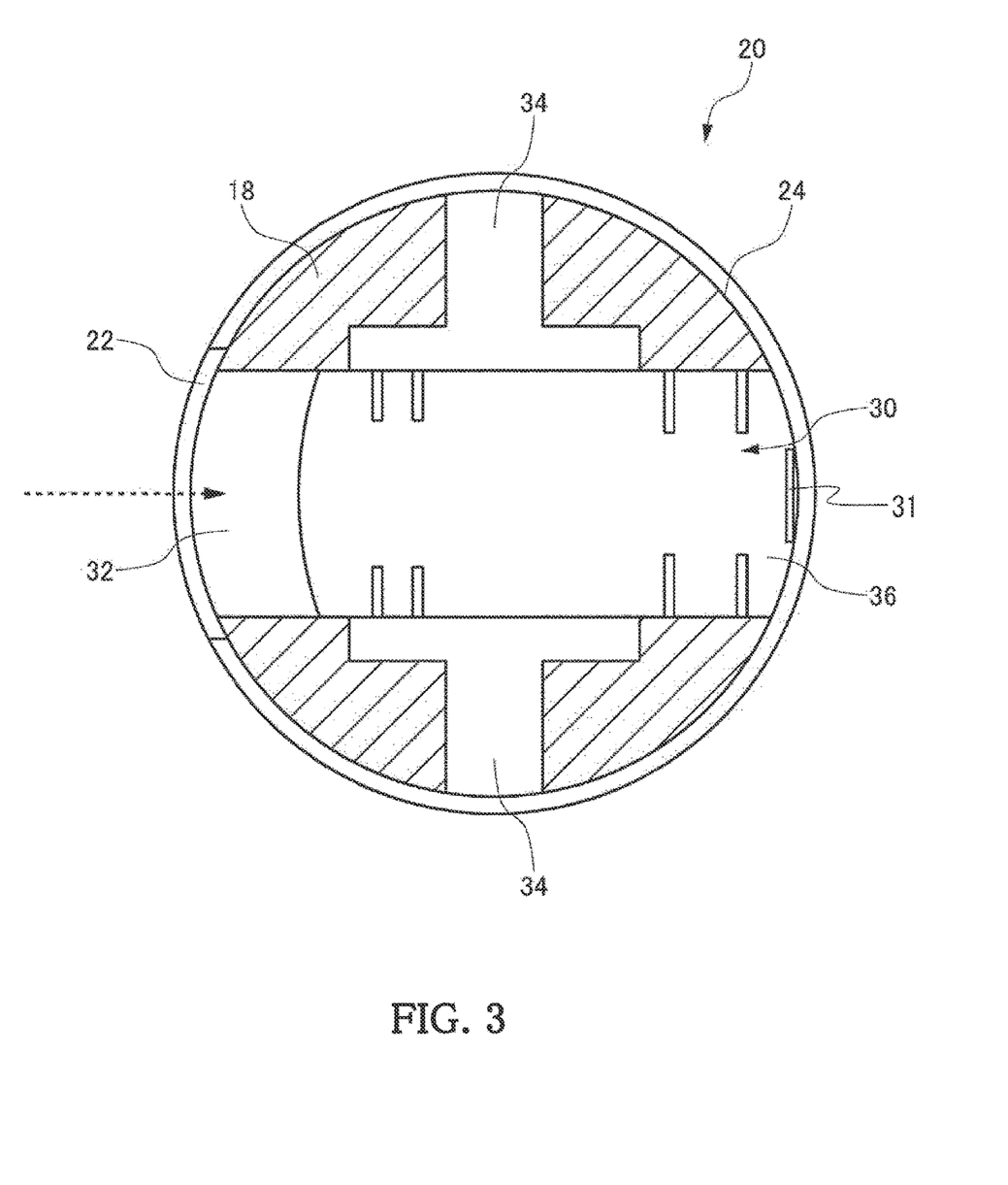
FIG. 3 is a top schematic view of a check-in and check-out room of the embodiment.
Figure 4:
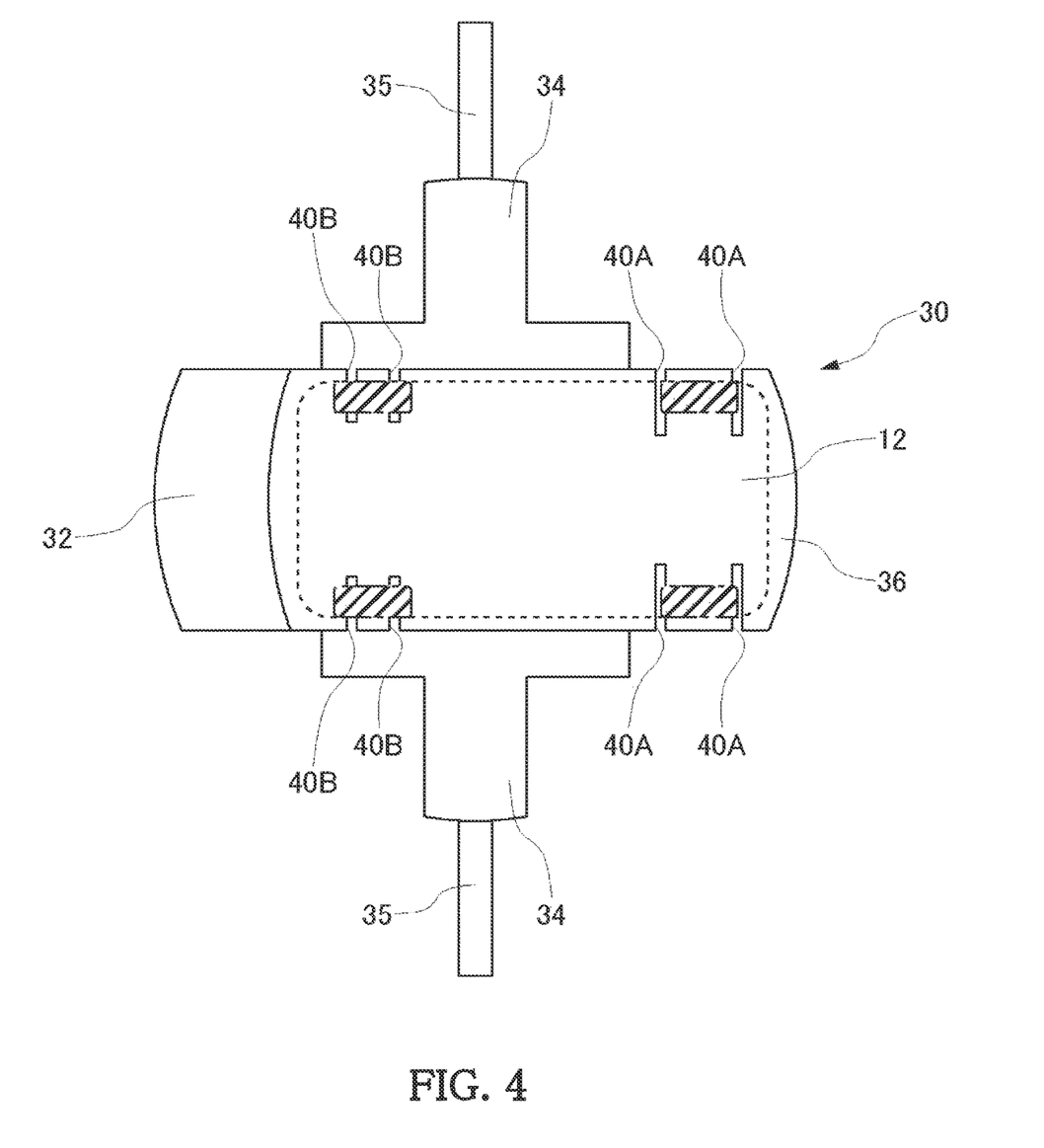
FIG. 4 is a top schematic view of a carrier of the embodiment.
Figure 5:
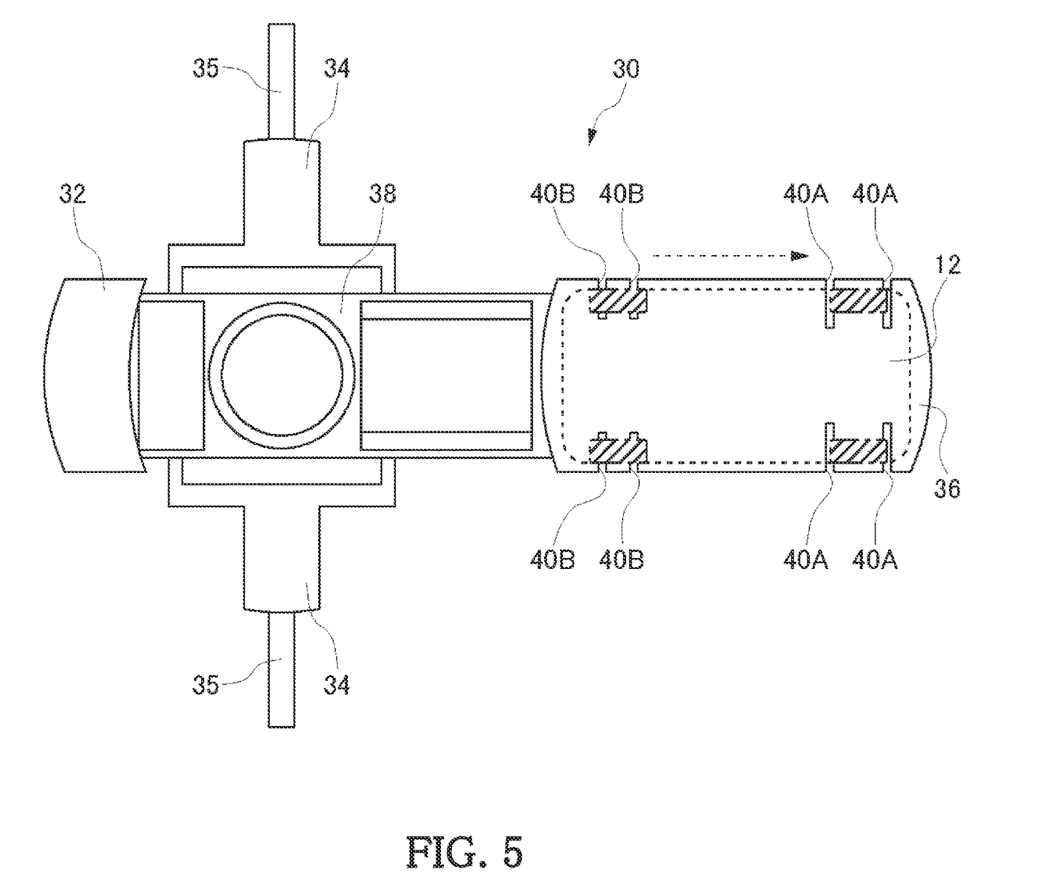
FIG. 5 is a top schematic view showing an elongated state of the carrier of the embodiment.

The carrier 30 will be described in detail next with reference to FIGS. 3 to 5. FIG. 3 is a top schematic view of the check-in and check-out room 24, FIG. 4 is a top schematic view of the carrier 30, and FIG. 5 is a top schematic view showing an elongated state of the carrier 30.

The carrier 30 is placed in the check-in and check-out room 24 as described above, and a vehicle 12 enters there from a direction of the arrow in FIG. 3 and is loaded on the carrier 30. Areas hatched with diagonal lines in FIG. 3 correspond to the lid plate 18, and the area other than the areas hatched with diagonal lines is the carrier 30, which moves up and down.

A monitor 31 is installed on a wall in the check-in and check-out room 24 opposed to the front of an entered vehicle 12. The monitor 31 displays an exact position of a vehicle 12 shot by a camera installed in the check-in and check-out room 24, whether front wheels get caught (described later) or not, and corresponding instructions to move forward or backward.

The carrier 30 comprises a body part 32 for being loaded with a vehicle 12, and a deck part 34 which is an area where occupants get in and out of a vehicle 12. The body part 32 is supported via the deck part 34 by a support member 35 (see FIG. 4), to which a wire is attached (not shown). A counterweight is attached to the other end of the wire, and this causes the carrier 30 to move up and down.

As shown in FIG. 5, the body part 32 of the carrier 30 comprises a slide part 36 and a turn deck part 38. The turn deck part 38 has a mechanism for turning the body part 32, and the slide part 36 is provided on the topside of the turn deck part 38.

The slide part 36 is loaded with a vehicle 12 and moves from the turn deck part 38 to the direction of the arrow in FIG. 5. This movement of the slide part 36 causes the carrier 30 to elongate, and causes the movement of the vehicle 12 to and from a storage 14.

The slide part 36 is formed with gaps (hereinafter referred to as "slits") 40A in areas on which front wheels of a vehicle 12 are set, and with gaps (hereinafter referred to as "slits") 40B in areas on which rear wheels are set. The slide part 36 is designed in such a way that the spaces between two slits 40A are wider than the spaces between two slits 40B. The areas between two slits 40A on which front wheels of a vehicle 12 are set are of a recess shape which is depressed and a bit lower than the other area of the slide part 36. Front wheels of a vehicle 12 getting caught in the depressions restricts the movement of the vehicle 12 on the slide part 36, and prevents the vehicle 12 from dropping off the slide part 36. For this purpose, an occupant of a vehicle 12 loads the vehicle 12 on the carrier 30 placed in the check-in and check-out room 24 in such a way that the front wheels get caught in the depressions of the slide part 36. Note that in the following description the slits 40A and the slits 40B are simply referred to as the slits 40 when no distinction is made between them. The number of slits 40 corresponding to one wheel is at least two, and three or more slits 40, for example, may be formed for one wheel.

For an occupant of a vehicle 12 to confirm that front wheels have got caught in the depressions of the slide part 36, a tier detection sensor may be provided near slits 40A (both sides of a depression area, or the like). This causes the sensor to detect whether front wheels are caught or not, and allows for reliably preventing a drop of a vehicle 12 or other accidents when they are not caught by informing an occupant of the vehicle 12 of that with a sound or an image.

The storing of a vehicle 12 from the carrier 30 onto a parking room pallet 50 of the embodiment will be described next with reference to FIGS. 6A, 6B, and 7. The parking room pallet 50 is provided for each storage 14, and is a pallet of a so-called comb type that can be loaded with one vehicle 12.

Figure 6A:
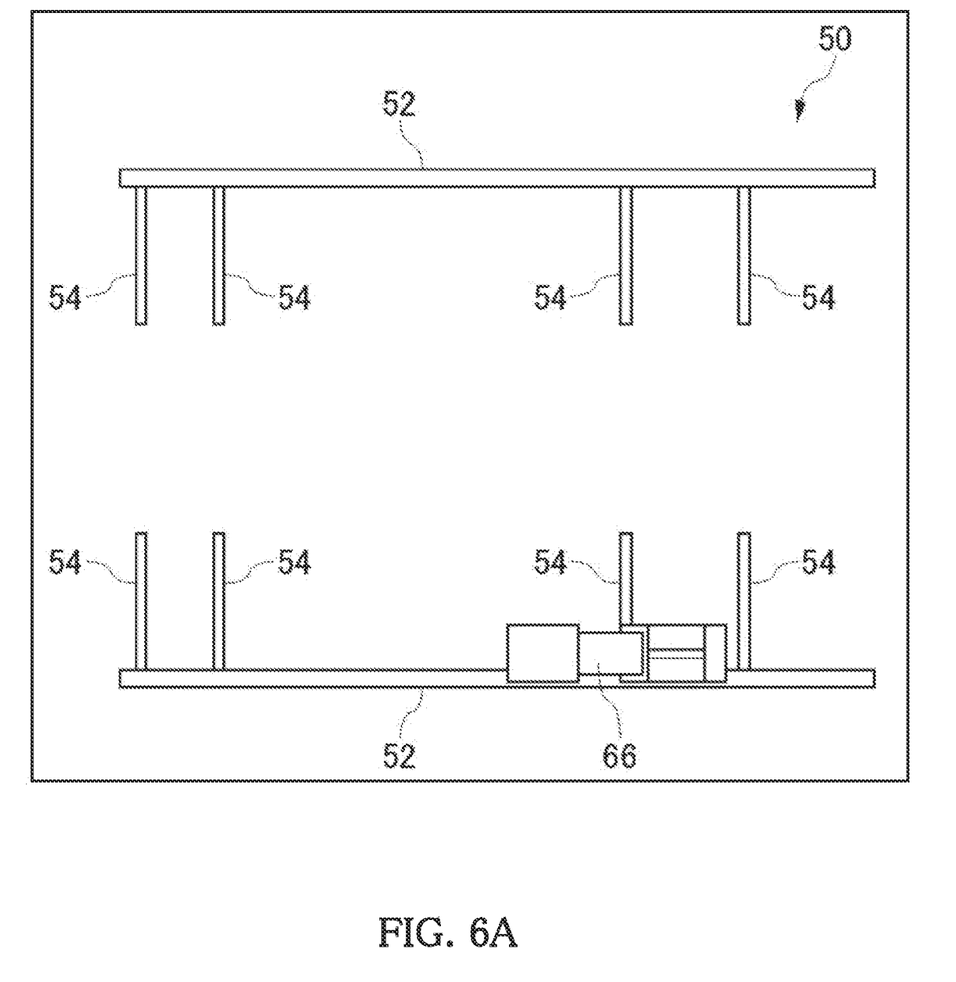
FIG. 6A is a top view of a parking room pallet and a slide part.

As shown in FIG. 6A, the parking room pallet 50 of the embodiment is formed of a pair of body parts 52 and a plurality of wheel support members 54. The pair of body parts 52 extend in a direction parallel to both sides of a vehicle 12. The wheel support members 54 are provided in a direction perpendicular to the body parts 52 in order to support each wheel of a vehicle 12 in a front-rear direction of the vehicle 12. The slits 40 of the slide part 36 are formed as gaps through which the wheel support members 54 pass in a vertical direction.

The wheel support members 54 may be capable of being removed from and reattached to the body parts 52. For example, in order to make the parking room pallet 50 be compatible with vehicles 12 with longer wheelbases and vehicles 12 with shorter wheelbases, the position to attach the wheel support members 54 to the body parts 52 may be able to be changed as appropriate.

A process of storing a vehicle 12 from the carrier 30 onto a parking room pallet 50 will be described next. After the carrier 30 moves to a specified floor on which a vehicle 12 is to be stored, the slide part 36 loaded with the vehicle 12 moves (elongates) toward a parking room pallet 50 of a storage 14 (step A in FIG. 7).

Figure 7:
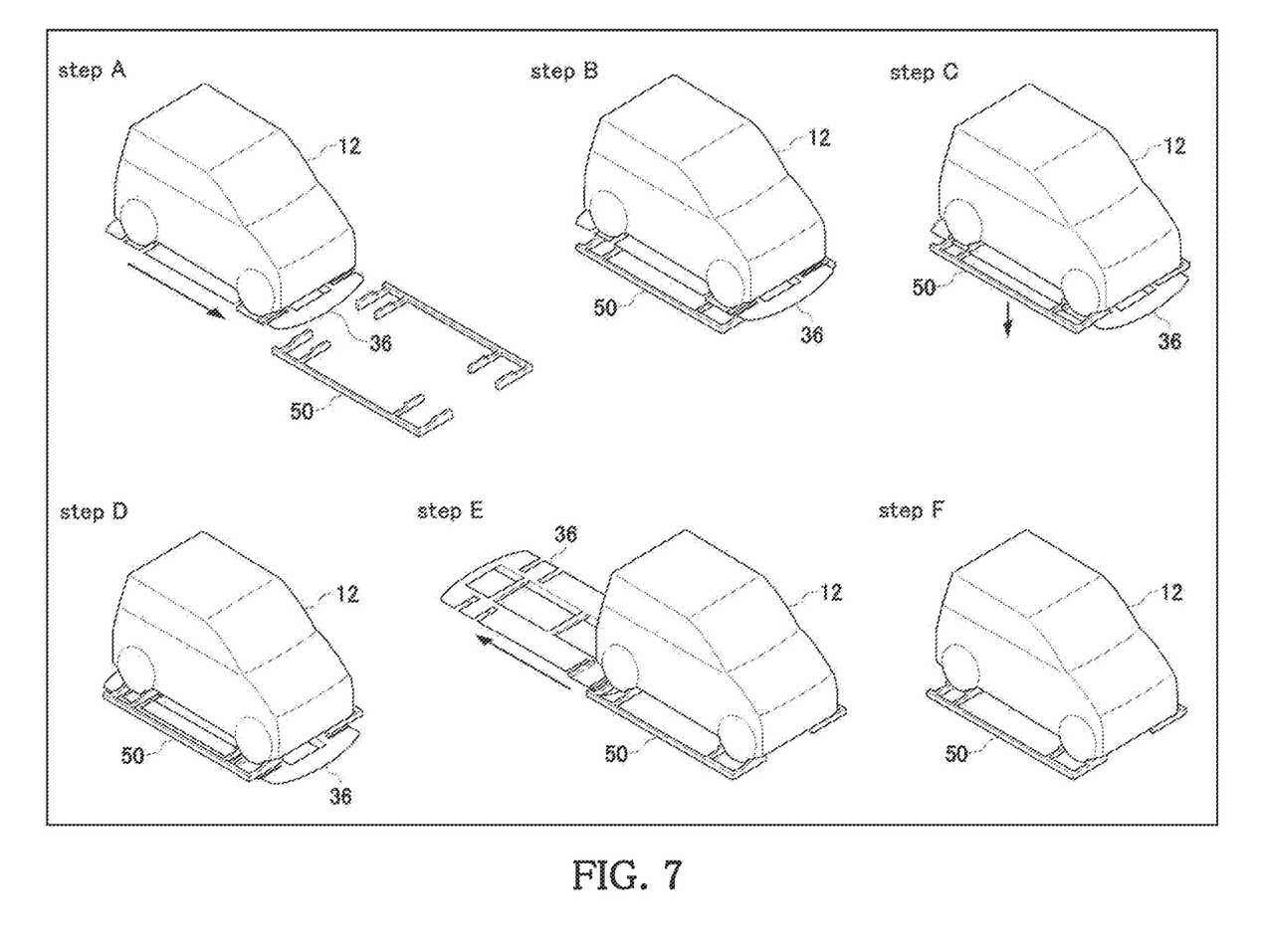
FIG. 7 shows a process of storing a vehicle from the carrier onto the parking room pallet of the embodiment.

The slide part 36 moves to a position where the slits 40 and the wheel support members 54 coincide, and then stops the elongation (step B in FIG. 7).

After the slide part 36 stops elongation, the carrier 30 moves downward (step C in FIG. 7). At this time, the wheel support members 54 of the parking room pallet 50 pass through the slits 40 of the slide part 36.

When the slide part 36 becomes located below the parking room pallet 50 with the downward movement of the carrier 30, the vehicle 12 moves from the slide part 36 to the parking room pallet 50 (step D in FIG. 7).

After that, the slide part 36 contracts in order to return to the turn deck part 38 (step E in FIG. 7), and the movement of the vehicle 12 from the carrier 30 to the storage 14 is complete (step F in FIG. 7). The carrier 30 returns to the check-in and check-out room 24 after the completion of the movement of the vehicle 12, but the embodiment is not limited to this, and the carrier 30 may move to a storage floor on which a vehicle 12 waiting to be checked out is stored.

When a vehicle 12 is moved from a storage 14 to the carrier 30 for check-out, the carrier 30 operates the reverse of the operation shown in steps A to F in FIG. 7.

Now, as described above, the parking facility 10 of the embodiment is made to be able to accommodate also electric cars and rechargeable hybrid cars. The parking facility 10 of the embodiment therefore allows for charging of electric cars or the like stored in the storages 14.

Figure 8A:
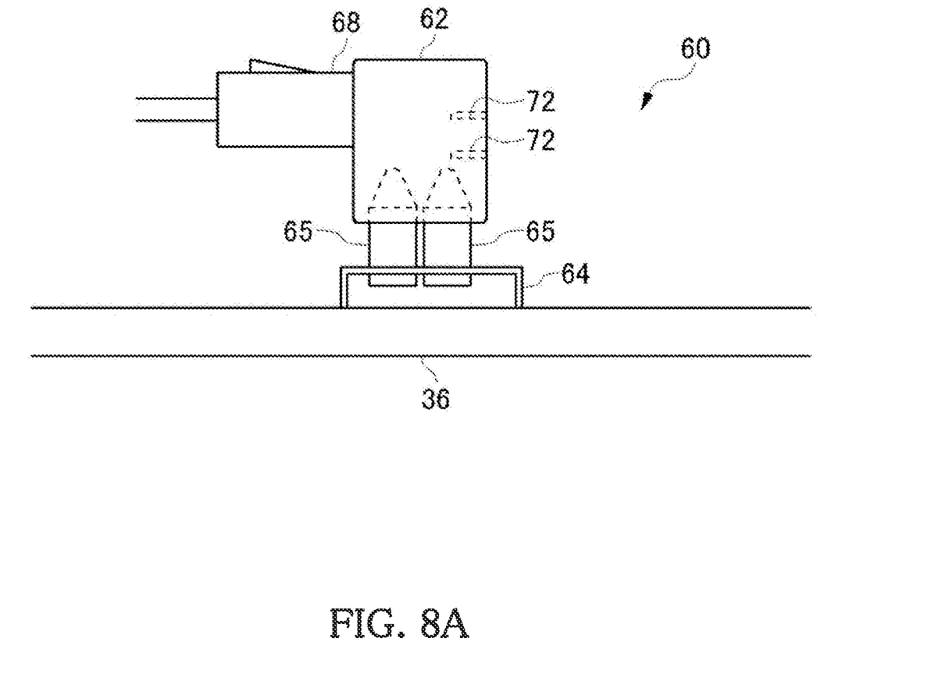
FIG. 8A is a schematic configuration view of a vehicle charging apparatus of the embodiment.
Figure 8B:
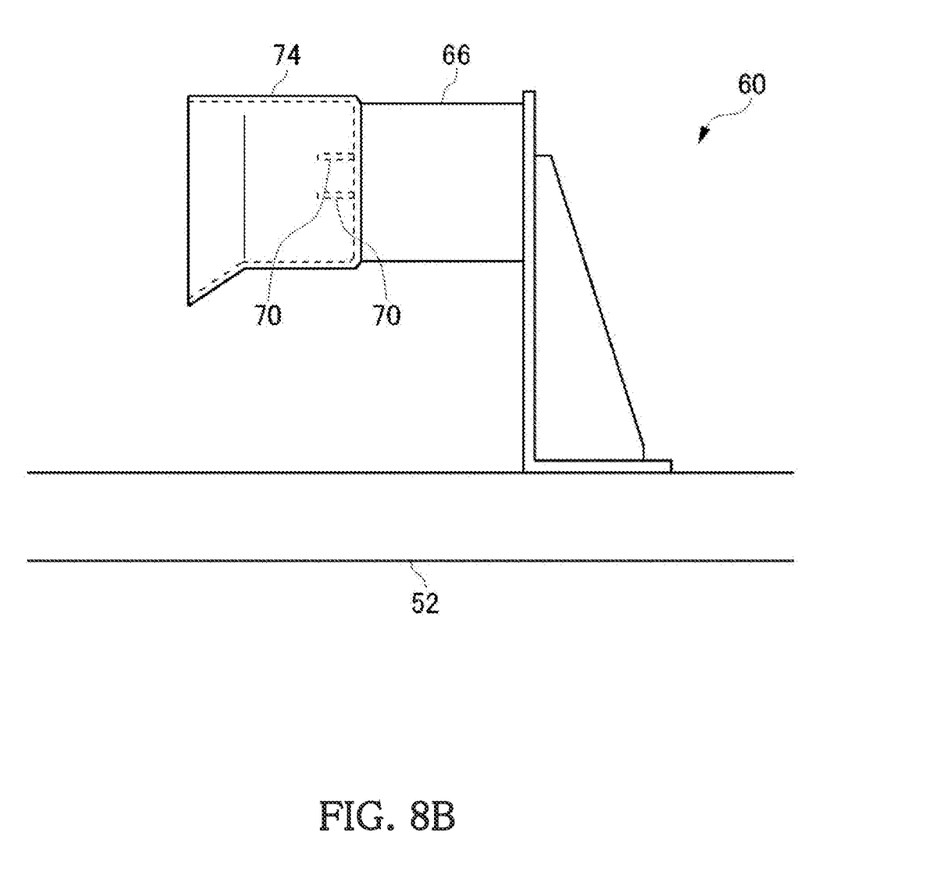
FIG. 8B is a schematic configuration view of a charging box receiving part of the embodiment.

A vehicle charging apparatus 60 of the parking facility 10 of the embodiment will be described with reference to FIGS. 8A and 8B. FIGS. 8A and 8B is a schematic side view of a charging box 62, a placement part 64, and a charging box receiving part 66 which comprise the vehicle charging apparatus 60 of the embodiment. Note that the rightward direction in FIGS. 8A and 8B on the paper corresponds to the forward direction of a vehicle 12 to be stored in a storage 14.

The charging box 62 is a charging part to be connected with a charging cable 68 of a vehicle 12. Note that the charging cable 68 is connected to and disconnected from the charging box 62 by an occupant of a vehicle 12.

The charging box 62 is made to be able to connect to the placement part 64 or the charging box receiving part 66. For example, the charging box 62 connects to the placement part 64 on the underside of the charging box 62, and connects to the charging box receiving part 66 in a direction of the movement of a vehicle 12 from the carrier 30 to a storage 14.

The charging box 62 is connected to the charging box receiving part 66 not just mechanically but also electrically. For this purpose, the charging box receiving part 66 is provided with power supply pins 70. Inserting the power supply pins 70 into pin insertion parts 72 provided on the charging box 62 causes the charging box 62 and the charging box receiving part 66 to fit together and electrically connect.

The charging cable 68 is sometimes attached with a controller. The charging box 62 may therefore be provided with a mount for mounting such a controller.

The placement part 64 is a member that is provided on the carrier 30 and connects to the charging box 62, thereby placing the charging box 62 on the carrier 30. The placement part 64 is provided with placement pins 65, which fit into the charging box 62. There are two placement pins 65 in the embodiment, but this is just an example, and the number of the placement pins 65 may be one, or three or more as long as they can support the charging box 62. The charging box 62 may also be provided with pins to fit into the placement part 64. Moreover, the fitting method is not limited to the one using pins and may be a slide fitting method as long as the placement part 64 can be removed from the charging box 62, or a gripping/sandwiching method using an arm or the like or a removing method using magnetism or the like may be employed instead of the fitting methods.

Figure 6B:
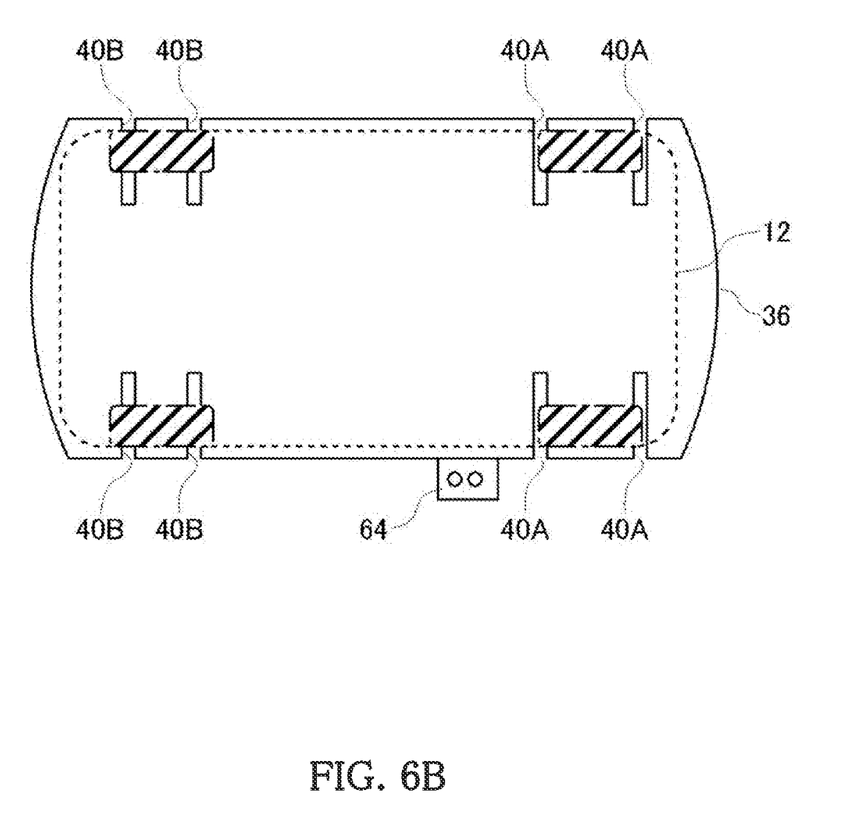
FIG. 6B is a top view of a slide part.

As shown in FIG. 6B, the placement part 64 is provided below a vehicle 12 loaded on the slide part 36 (the carrier 30) and near a front wheel of the vehicle 12. This placement position is convenient for an occupant of the vehicle 12 to connect the charging box 62 to the placement part 64 as described below. The placement part 64 moves with the elongation and contraction of the slide part 36 since it is provided on the slide part 36.

The charging box receiving part 66 is a feeding part provided on a storage 14 for connecting to the charging box 62 and supplying power to the charging cable 68. As shown in FIG. 6A, the charging box receiving part 66 is placed on each parking room pallet 50 in such a way as to correspond to the position of the placement part 64 placed on the slide part 36. Supplied with power from the parking facility 10, the charging box receiving part 66 supplies power by means of the charging cable 68 via the connected charging box 62.

The charging box receiving part 66 of the embodiment is provided with a cover member 74 for covering both sides and the topside of the connected charging box 62. The cover member 74 prevents dust, litter, or the like from adhering to the connection between the charging box 62 and the charging box receiving part 66, that is, the electric contacts. The cover member 74 also has a role to guide the insertion of the power supply pins 70 into the pin insertion parts 72.

With such a configuration of the vehicle charging apparatus 60, the charging box 62 connects with the placement part 64 when a vehicle 12 is carried by the carrier 30. The charging box 62 then connects to the charging box receiving part 66 with the movement of the vehicle 12 from the carrier 30 to a parking room pallet 50 (a storage 14). The charging box 62 is disconnected from the placement part 64 after the connection of the charging box 62 to the charging box receiving part 66.

This causes the charging box 62 placed on the carrier 30 to move to the storage 14 (the parking room pallet 50) with the storing of the vehicle 12 into the storage 14. The charging box 62 then connects to the charging box receiving part 66, which causes the vehicle 12 to be charged via the charging cable 68 connected to the charging box 62. The parking facility 10 thus allows for charging a stored vehicle 12 even though it transfers only vehicles 12 from the carrier 30 to the storages 14.

A process of movement of the charging box 62 in the parking facility 10 of the embodiment will be described next with reference to FIG. 9. Note that the rightward direction in FIG. 9 on the paper corresponds to the forward direction of a vehicle 12 to be stored in a storage 14.

First, when a vehicle 12 is checked in, the vehicle 12 is loaded on the carrier 30 in the check-in and check-out room 24. A plurality of charging boxes 62 are placed in a specified position in the check-in and check-out room 24. An occupant of the vehicle 12 connects a charging box 62 to the placement part 64 in the check-in and check-out room 24, and connects the charging cable 68 to the charging box 62.

After the occupant exits the check-in and check-out room 24, the carrier 30 moves to a specified floor on which the vehicle 12 is to be stored.

Figure 9:
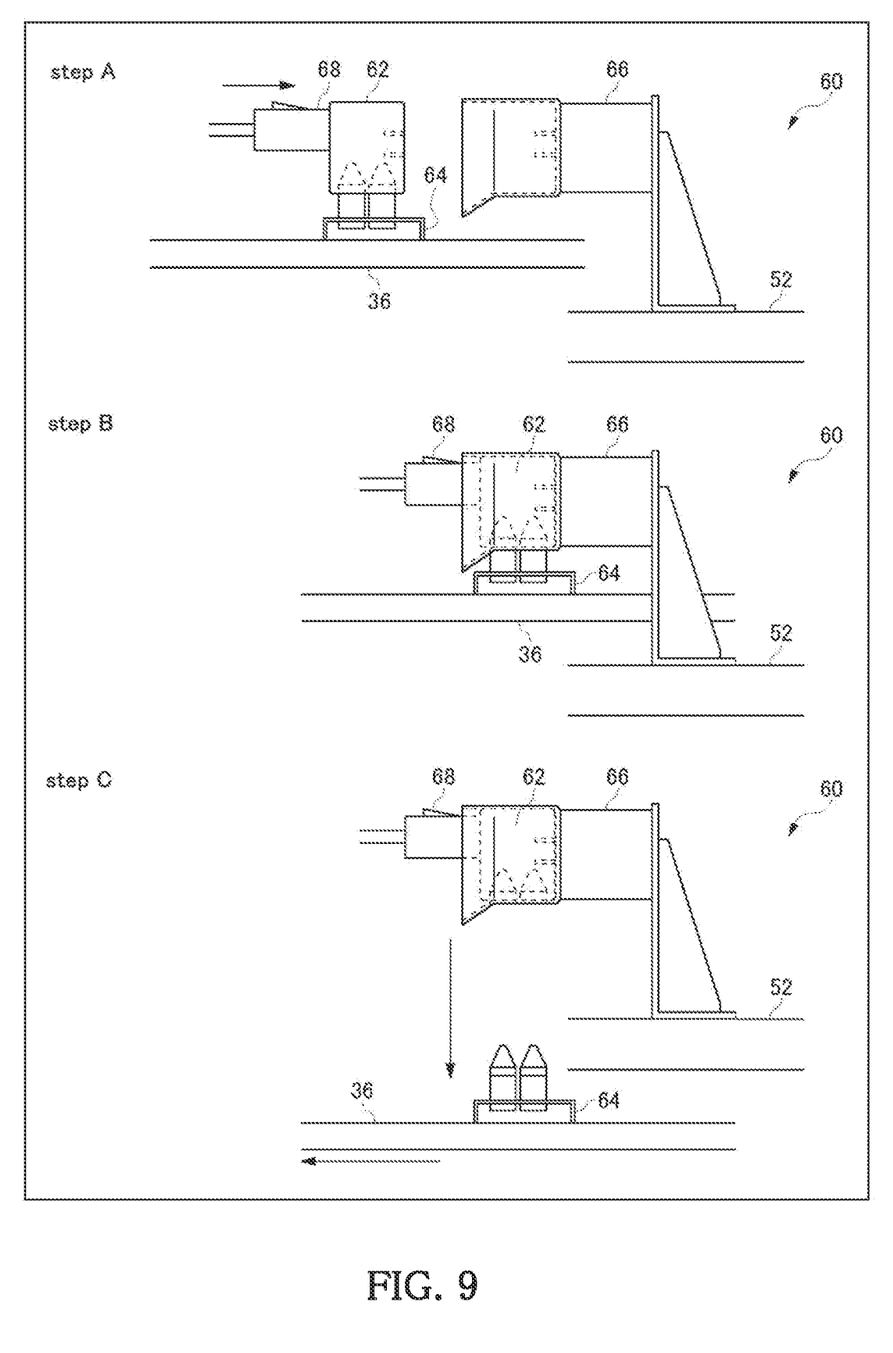
FIG. 9 shows a process of movement of a charging box of the embodiment.

After the carrier 30 loaded with the vehicle 12 moves to the specified floor, the slide part 36 with the vehicle 12 being loaded thereon elongates to the parking room pallet 50 (step A in FIG. 9). The charging box 62 connects to the charging box receiving part 66 with the elongation of the slide part 36 (step B in FIG. 9).

The carrier 30 then moves downward relative to the parking room pallet 50 and thereby moves the vehicle 12 to the parking room pallet 50, and after that the slide part 36 contracts. The charging box 62 is disconnected from the placement part 64 with the downward movement of the carrier 30 relative to the parking room pallet 50 (step C in FIG. 9).

As described above, when a vehicle 12 is checked in, the charging box 62 connects to the charging box receiving part 66 with the elongation operation of the carrier 30 for moving the vehicle 12 from the carrier 30 to the parking room pallet 50. The charging box 62 is then disconnected from the placement part 64 with the downward movement of the carrier 30. The parking facility 10 of the embodiment therefore eliminates the need for a dedicated configuration to allow for the connection of the charging box 62 to the charging box receiving part 66 and the disconnection of the charging box 62 from the placement part 64.

On the other hand, when a vehicle 12 is checked out, the operation is the reverse of when a vehicle 12 is checked in.

The carrier 30 moves to a specified floor on which a vehicle 12 to be checked out is stored, and the slide part 36 then elongates to the parking room pallet 50. At this time, the slide part 36 is located below the parking room pallet 50. The carrier 30 then moves upward relative to the parking room pallet 50 and thereby moves the vehicle 12 from the parking room pallet 50 to the slide part 36. As a result, the charging box 62 connecting with the charging box receiving part 66 connects to the placement part 64 with the upward movement of the carrier 30 relative to the parking room pallet 50.

The carrier 30 contracts after moving the vehicle 12 from the parking room pallet 50 to the slide part 36. The charging box 62 is disconnected from the charging box receiving part 66 with the contraction of the carrier 30. This causes the charging box 62 connecting with the placement part 64 to move to the carrier 30 together with the vehicle 12, and the carrier 30 moves to the check-in and check-out room 24.

After the carrier 30 reaches the check-in and check-out room 24, an occupant of the vehicle 12 enters the check-in and check-out room 24, and pulls out the charging cable 68 from the charging box 62. The occupant then pulls out the charging box 62 from the placement part 64, and returns the charging box 62 to the specified position in the check-in and check-out room 24. After finishing such a process, the occupant checks out the vehicle 12.

As just described, when a vehicle 12 is checked out, the charging box 62 connects to the placement part 64 with the upward movement of the carrier 30. The charging box 62 is then disconnected from the charging box receiving part 66 with the contraction operation of the carrier 30 for moving the vehicle 12 from the parking room pallet 50 to the carrier 30.

In the parking facility 10 of the embodiment, a very small electric current may be passed from the charging box receiving part 66 to the charging box 62 in order to check if the charging box 62 is securely and electrically connected to the charging box receiving part 66 or not. If the very small electric current flows, it is determined that the charging box 62 is securely connected to the charging box receiving part 66, and charging is started. On the other hand, if the very small electric current does not flow, it is determined that the charging box 62 is not connected to the charging box receiving part 66, and charging is not done.

When an occupant plugs the charging cable 68 into the charging box 62, the parking facility 10 may inform by voice or the like that the charging cable 68 should be fully plugged into the charging box 62. Moreover, at check-out, the parking facility 10 may inform that an occupant should pull out the charging cable 68 from the charging box 62 and return the charging box 62 to the specified position.

While the disclosure has been described with reference to the above embodiment, the technical scope of the disclosure is not limited to the scope provided by the embodiment. Various modifications or improvements can be made to the embodiment without departing from the gist of the disclosure, and those added with the modifications or improvements are also included in the technical scope of the disclosure.

While a description has been made for the embodiment on a mode in which the parking facility 10 is an underground parking facility whose frame 16 is buried underground, the disclosure is not limited to this. The frame 16 of the parking facility 10 may be placed on the ground. In this mode, the check-in and check-out room 24 is placed in the bottom layer of the frame 16. There may also be a mode in which some lower layers of the frame 16 are buried underground.

While a description has been made for the embodiment on a mode in which a vehicle 12 is moved with upward and downward movements of the carrier 30 relative to the parking room pallet 50, the disclosure is not limited to this. The carrier 30 and the parking room pallet 50 have just to move upward and downward relative to each other, and a vehicle 12 may be moved with upward and downward movements of the parking room pallet 50 relative to the carrier 30.

While a description has been made for the embodiment on a mode in which a vehicle 12 moves in a front-rear direction when the vehicle 12 is stored in a storage 14, the disclosure is not limited to this. There may be a mode in which a vehicle 12 moves in a transverse direction, that is, a horizontal direction when the vehicle 12 is stored in a storage 14. In this mode, the charging box 62, the placement part 64, and the charging box receiving part 66 are placed so that the charging box 62 connects to the charging box receiving part 66 with the horizontal movement of the vehicle 12.

While a description has been made for the embodiment on a mode in which the charging boxes 62 are placed in a specified position in the check-in and check-out room 24 and they are returned to the specified position when vehicles 12 are checked out, the disclosure is not limited to this. For example, there may be a mode in which a charging box 62 is provided for each vehicle 12 to be checked in the parking facility 10 and the owner of each vehicle 12 is in charge of each charging box 62. This mode is applied to, for example, vehicles 12 that are under monthly contract for the parking facility 10. On the other hand, there may be a mode in which the above mode is not applied to vehicles 12 that use hourly parking and the charging boxes 62 placed in the specified position are used for them.

DESCRIPTION OF THE SYMBOLS

10: Parking facility
12: Vehicle
14: Storage
30: Carrier
36: Slide part (Loading part)
60: Vehicle charging apparatus
62: Charging box (Charging part)
64: Placement part
66: Charging box receiving part (Feeding part)
68: Charging cable

The invention claimed is:

1. A vehicle charging apparatus for an automated parking apparatus that carries a vehicle to a specified floor by means of a carrier operable to move up and down, moves the vehicle from the carrier to a specified storage provided on the specified floor, and stores the vehicle in the storage, the vehicle charging apparatus comprising:
   a charging part for being connected with a charging cable of the vehicle;
   a placement part provided on the carrier for connecting to the charging part; and
   a feeding part provided on the storage for connecting to the charging part and supplying power to the charging cable, wherein
   the charging part connects with the placement part when the vehicle is carried by the carrier, the charging part connects to the feeding part with the movement of the vehicle from the carrier to the storage, and the charging part is disconnected from the placement part after the connection of the charging part to the feeding part.

2. The vehicle charging apparatus according to claim 1, wherein when the vehicle is checked in:

the carrier loaded with the vehicle elongates to the storage with the vehicle being loaded thereon after moving to the specified floor and contracts after moving downward relative to the storage and thereby moving the vehicle to the storage, and the charging part connects to the feeding part with the elongation of the carrier and is disconnected from the placement part with the carrier's downward movement relative to the storage.

3. The vehicle charging apparatus according to claim 2, wherein the charging part connects to the placement part on the charging part's underside, and connects to the feeding part in a direction of the vehicle's movement from the carrier to the storage.

4. The vehicle charging apparatus according to claim 2, wherein when the vehicle is checked out:

the carrier elongates to the storage after moving to the specified floor on which the vehicle to be checked out is stored and contracts after moving upward relative to the storage and thereby moving the vehicle from the storage, and the charging part connects to the placement part with the carrier's upward movement relative to the storage and is disconnected from the feeding part with the contraction of the carrier.

5. The vehicle charging apparatus according to claim 4, wherein the charging part connects to the placement part on the charging part's underside, and connects to the feeding part in a direction of the vehicle's movement from the carrier to the storage.

6. The vehicle charging apparatus according to claim 1, wherein when the vehicle is checked out:

the carrier elongates to the storage after moving to the specified floor on which the vehicle to be checked out is stored and contracts after moving upward relative to the storage and thereby moving the vehicle from the storage, and the charging part connects to the placement part with the carrier's upward movement relative to the storage and is disconnected from the feeding part with the contraction of the carrier.

7. The vehicle charging apparatus according to claim 6, wherein the charging part connects to the placement part on the charging part's underside, and connects to the feeding part in a direction of the vehicle's movement from the carrier to the storage.

8. The vehicle charging apparatus according to claim 1, wherein the placement part is provided below the vehicle loaded on the carrier and near a front wheel of the vehicle.

9. The vehicle charging apparatus according to claim 1, wherein the storage comprises:

a pair of body parts extending in a direction parallel to both sides of the vehicle; and a plurality of wheel support members provided in a direction perpendicular to the body parts in order to support each wheel of the vehicle in a front-rear direction of the vehicle, and a loading part of the carrier for being loaded with the vehicle to move to the storage is formed with gaps through which the wheel support members pass in a vertical direction.

10. An automated parking apparatus that carries a vehicle to a specified floor by means of a carrier operable to move up and down, moves the vehicle from the carrier to a specified storage provided on the specified floor, and stores the vehicle in the storage, the automated parking apparatus comprising:

a charging part for being connected with a charging cable of the vehicle;

a placement part provided on the carrier for connecting to the charging part; and a feeding part provided on the storage for connecting to the charging part and supplying power to the charging cable, wherein the charging part connects with the placement part when the vehicle is carried by the carrier, the charging part connects to the feeding part with the movement of the vehicle from the carrier to the storage, and the charging part is disconnected from the placement part after the connection of the charging part to the feeding part.

* * * * *